United States Patent [19]

Monet et al.

[11] Patent Number: 4,674,111
[45] Date of Patent: Jun. 16, 1987

[54] METHOD AND APPARATUS FOR AUTOMATIC DIALING IN MOBILE RADIO TELEPHONE SYSTEMS

[75] Inventors: Paul E. Monet, Manlius; Yves Dufresne, Webster, both of N.Y.

[73] Assignee: Harris Corporation, Melbourne, Fla.

[21] Appl. No.: 651,712

[22] Filed: Sep. 18, 1984

[51] Int. Cl.⁴ .......................................... H04M 11/00
[52] U.S. Cl. ..................................... 379/58; 379/110; 379/280; 379/356
[58] Field of Search ........... 179/90 B, 90 BD, 90 BB, 179/2 EA, 2 EB, 18 BD; 235/91 E, 18 B

[56] References Cited

U.S. PATENT DOCUMENTS

| | | | |
|---|---|---|---|
| 3,670,111 | 7/1972 | Bukosky et al. | 179/90 BD |
| 3,988,550 | 10/1976 | Tsao | 179/90 BB |
| 4,031,515 | 6/1977 | Kashio | 364/200 |
| 4,119,810 | 10/1978 | Marin et al. | 179/90 K |
| 4,122,304 | 10/1978 | Mallien | 179/2 EB |
| 4,160,125 | 7/1979 | Bower et al. | 179/6 D |
| 4,188,510 | 2/1980 | Bower et al. | 179/90 BD |
| 4,232,200 | 11/1980 | Hestad | 179/90 K |
| 4,277,681 | 7/1981 | Fisher et al. | 179/90 B |
| 4,485,274 | 11/1984 | Jordan et al. | 179/90 BD |

FOREIGN PATENT DOCUMENTS

| | | | |
|---|---|---|---|
| 6149156 | 11/1981 | Japan | 179/90 B |
| 1065962 | 4/1967 | United Kingdom | 179/90 BB |

Primary Examiner—Robert Lev
Attorney, Agent, or Firm—L. Lawton Rogers, III; Joseph M. Killeen

[57] ABSTRACT

A mobile telephone and method of dialing in which telephone numbers are stored in immediately adjacent memory locations and in which dialing is automatically and timely accomplished in a plurality of signalling formats.

14 Claims, 9 Drawing Figures

FIG. 3 (prior art)

| | | | | | | | | | | | |
|---|---|---|---|---|---|---|---|---|---|---|---|
| REG 1 | 7 | 0 | 3 | 9 | 2 | 0 | 3 | 2 | 1 | 5 | E |
| REG 2 | 5 | 5 | 5 | 1 | 2 | 1 | 2 | E | | | |
| REG 3 | 2 | 0 | 2 | 6 | 6 | 7 | 9 | 4 | 9 | 5 | E |
| REG 4 | 3 | 7 | 0 | 6 | 1 | 3 | 2 | E | | | |

FIG. 7

| F | 7 | 0 | 3 | 9 | 2 | 0 | 3 | 2 | 1 | 5 | F | 5 | 5 |
| 5 | 1 | 2 | 1 | 2 | F | 2 | 0 | 2 | 6 | 6 | 7 | 9 | 4 |
| 9 | 5 | F | 3 | 7 | 0 | 6 | 1 | 3 | 2 | E | | | |

FIG. 8

| F | 7 | 0 | 3 | 9 | 2 | 0 | 3 | 2 | 1 | 5 | F | 5 | 5 |
| 5 | 1 | 2 | 1 | 2 | F | F | 3 | 7 | 0 | 6 | 1 | 3 | 2 |
| E | | | | | | | | | | | | | |

FIG. 6

| F | 1 | 7 | 0 | 3 | 9 | 2 | 0 | 3 | 2 | 1 | 5 | F | 4 |
| 3 | 7 | 0 | 6 | 1 | 3 | 2 | F | 3 | 2 | 0 | 2 | 6 | 6 |
| 7 | 9 | 4 | 9 | 5 | F | 2 | 5 | 5 | 5 | 1 | 2 | 1 | 2 |
| E | | | | | | | | | | | | | |

| 18 | 11 | 1 | 28 | 0 | 0 | 0 | 0 | 0 | 2 | 0 | 2 | 6 |
|----|----|---|----|---|---|---|---|---|---|---|---|---|
| 6  | 7  | 9 | 4  | 9 | 5 | 5 | 5 | 5 | 1 | 2 | 1 | 2 | 7 |
| 0  | 3  | 9 | 2  | 0 | 3 | 2 | 1 | 5 | 3 | 7 | 0 | 6 | 1 |
| 3  | 2  | E |    |   |   |   |   |   |   |   |   |   |

*FIG. 9*

| 0 | 1 | S | 7 | 0 | 3 | 9 | 2 | 0 | 3 | 2 | 1 | 5 | E |
|---|---|---|---|---|---|---|---|---|---|---|---|---|---|
| 0 | 3 | S | 2 | 0 | 2 | 6 | 6 | 7 | 9 | 4 | 9 | 5 | E |
| 0 | 2 | S | 5 | 5 | 5 | 1 | 2 | 1 | 2 | E | 0 | 4 | S |
| 3 | 7 | 0 | 6 | 1 | 3 | 2 | E | E |   |   |   |   |   |

*FIG. 5*

| 7 | 0 | 3 | 9 | 2 | 0 | 3 | 2 | 1 | 5 | P | 5 | 5 | 5 | 1 | 2 | 1 | 2 | E |   |   |   |   |
|---|---|---|---|---|---|---|---|---|---|---|---|---|---|---|---|---|---|---|---|---|---|---|
| 2 | 0 | 2 | 6 | 6 | 7 | 9 | 4 | 9 | 5 | P | 3 | 7 | 0 | 6 | 1 | 3 | 2 | E |   |   |   |   |
|   |   |   |   |   |   |   |   |   |   |   |   |   |   |   |   |   |   |   |   |   |   |   |
|   |   |   |   |   |   |   |   |   |   |   |   |   |   |   |   |   |   |   |   |   |   |   |

*FIG. 4 (prior art)*

METHOD AND APPARATUS FOR AUTOMATIC DIALING IN MOBILE RADIO TELEPHONE SYSTEMS

BACKGROUND OF THE INVENTION

The invention relates to methods of dialing and particularly to automated methods of dialing in mobile radio telephone systems.

Known mobile radio telephone systems utilize a number of different signalling formats to communicate from one portion of the telecommunication system to another. The problems caused by differing signalling formats are particularly acute when a mobile radio telephone user desires to use a long distance subscriber system which is operated by an operator different from the operator of the mobile telephone system. Typically, in utilizing such long distance subscriber systems, a mobile radio telephone user must first dial a telephone number to establish a telephone call between the mobile unit and a local telephone number assigned to the long distance subscriber system. Once the user has gained access to the long distance subscriber system, the user is presented with a supervisory tone from the long distance subscriber to inform the user that the system is available and ready for operation. Often the user is required to key in a five-digit billing code followed by the seven to ten-digit telephone number of the remote location with which communication is desired.

Thus the dialing from a mobile telephone of a long distance telephone number through a long distance subscriber system may entail the dialing of three or more sets of numbers. Since many mobile telephones are installed in automobiles that are used while the telephone operator is driving the automobile, it is often difficult for the telphone user to divert his attention from the traffic in order to dial the many digits required. Additionally, the sets of numbers must stop and be dialed after receiving an acknowledgement signal from the system being dialed that the system is ready for dialing. For example, when the mobile telephone user indicates to the system that he desires to place a call, it may be a matter of thirty or more seconds before the mobile equipment has completed the initial channel assignment and hand-shaking routines with the base station and is ready to dial the desired local number. Similarly, it may take quite a few seconds for the call to be answered by the long distance subscriber system and there may be even a further wait associated with the validation and acceptance of the accounting code before the long distance subscriber system presents the supervisory tone to permit dialing of the ultimate telephone number. Given the unpredictability of the length of time associated with each one of these delays, it is usually not possible for the driver of an automobile to plan to divert his attention from his driving tasks at the appropriate times to continue the dialing sequence. Failure to timely resume the dialing procedures generally requires that the entire sequence begin anew.

The difficulties associated with dialing a long distance subscriber system through a mobile telephone unit are further complicated by the fact that often the initial call is placed using a signalling technique such as frequency shift keying to indicate the local telephone number and the long distance subscriber system responds to dual tone multifrequency ("DTMF") format signalling. While it is possible to equip the mobile telephone system with a manual switch by which the operator can command the mobile telephone to switch formats from FSK to DTMF, such a switch adds another level of complexity to the task of manually dialing the mobile telephone as it is another step which must be accomplished by the mobile telephone operator.

In land based telephone systems and in some mobile telephone systems, it is known to use repertory dialing to reduce the burden of dialing frequently called telephone numbers. In such systems, an entire telephone dialing sequence comprising a plurality of individual dialing commands or digits is stored in a memory device. Often, a plurality of such telephone dialing sequences are stored in the device and each dialing sequence is referenced by an index. To dial one of the dialing sequences, a user first indicates to the telephone instrument that he desires to use the repertory dialing capability and then indicates the identification of the index associated with the repertory dialing sequence which the user desires. Upon receipt of the repertory dialing request, the telephone instrument automatically retrieves the dialing sequence from the memory device and transmits the dialing signals appropriate to each digit of the dialing sequence.

In dialing using a long distance subscriber network, it is advantageous to be able to store and subsequently recall at least three different repertory dialing sequences: the telephone number of the local access to the long distance subscriber system; the billing account number of the telephone user; and the long distance number of the party desired to be called. However, many of the known repertory dialing telephone instruments do not permit repertory dialing commands to be concatenated, i.e., all the dialing commands to be entered at once in the order desired. Moreover, since the user must frequently wait for the receipt of a supervisory tone between the dialing of the local access number, the dialing of the account billing number, and the dialing of the number of the called party, simply concatenating the three desired numbers in a repertory dialing sequence will not accomplish the required dialing, since the required pauses may be ignored.

In using a memory device to store the dialing sequences, many known telephone instruments reserve a predetermined number of memory locations for each dialing sequence. For example, a memory device capable of storing 200 individual digits may be partitioned into ten storage areas or registers, each register being associated with a dialing sequence. In such telephone instruments, the number of storage locations assigned to each register and reserved for each dialing sequence is often gauged at the size of the longest dialing sequence customarily used. For example, to dial from a telephone in the United States to certain European countries, the dialing of up to twenty digits is frequently required. Thus, many known repertory dialing systems reserve twenty digits for storage of each repertory dialing sequence. Since most local or even U.S. long distance telephone numbers require the dialing of only seven or ten digits, the reservation of twenty digits for the storage of repertory dialing sequences may result in the nonuse of a significant number of memory storage locations.

It is therefore an object of the present invention to provide a mobile telephone instrument which obviates one or more of the problems of prior art instruments and to provide a novel method and apparatus for dialing mobile telephones.

It is another object of the present invention to provide a novel method and apparatus for storage of repertory dialing sequences.

It is still another object of the present invention to provide a novel method of dialing mobile radio telephones in which the dialing sequences are performed automatically in a plurality of signalling formats.

It is a further object of the present invention to provide a novel method and apparatus for determining the presence of a supervisory tone on a mobile telephone receiver.

It is still a further object of the present invention to provide a novel method and apparatus to automatically dial a long distance subscriber service or the like without the need to manually change signalling formats and without the need to manually restart the dialing sequence upon receipt of a supervisory tone.

It is yet another object of the present invention to provide a novel method and apparatus for concatenating multiple repertory dialing sequences in a mobile telephone instrument.

These and other objects and advantages of the present invention will best be understood by reference to the following specification taken in connection with the accompanying drawings.

BRIEF DESCRIPTION OF THE DRAWINGS

FIG. 3 is a pictorial representation of the memory storage locations in prior art devices;

FIG. 4 is a second pictorial representation of memory storage locations in prior art repertory dialing devices illustrating the storage of telephone dialing sequences therein;

FIG. 5 is a pictorial representation of the storage locations contained in the memory device of the telephone instrument of FIG. 1 illustrating a method of allocating storage locations in accordance with the present invention;

FIG. 6 is a pictorial representation of the storage locations contained in the memory device of the telephone instrument of FIG. 1 illustrating another method of allocating storage locations in accordance with the present invention; and FIG. 7 is a pictorial representation of the storage locations contained in the memory device of the telephone instrument of FIG. 1 illustrating another method of allocating storage locations in accordance with the present invention.

FIG. 8 is pictorial representation of the storage locations contained in the memory device of the telephone instrument of FIG. 1 illustrating a method of allocating storage locations as in FIG. 7, except that one of the telephone dialing sequences has been erased.

FIG. 9 is a pictorial representation of the storage locations contained in the memory device of the telephone instrument of FIG. 1 illustrating yet another method of allocating storage locations in accordance with the present invention.

DETAILED DESCRIPTION OF THE PREFERRED EMBODIMENT

Figure 1:
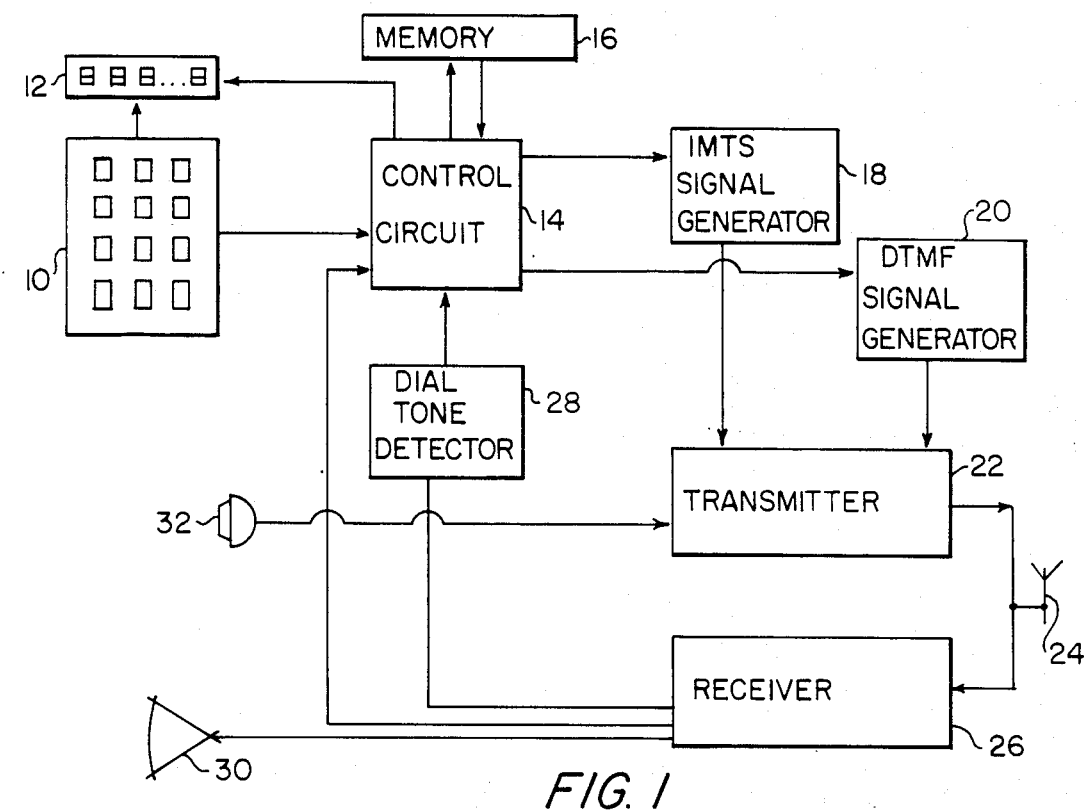
FIG. 1 is a block diagram of a mobile telephone apparatus according to the present invention.

Before proceeding with a detailed explanation of the method and apparatus of the present invention, a brief indication of the method of dialing mobile telephone instruments will be described.

In typical mobile telephone systems, the user of the system who desires to initiate a telephone call typically commands the telephone instrument via one of the function keys on the instrument that a call is to be placed and answers the telephone number of the telephone he wishes to call by entering the digits of the telephone number on the mobile telephone keypad. On receipt of the command to initiate a telephone call, the mobile telephone instrument seizes an available communications channel to a base station.

The base station may indicate that it is ready to receive the signals representing the telephone number to be dialed by placing a supervisory tone (dial tone) on the communication channel. Upon detecting the dial tone, the telephone number to be dialed is signalled by the telephone instrument to the base station using a conventional signalling format, often a frequency shift keyed signalling technique such as IMTS. The station, upon receiving the signals indicating the telephone number to be dialed, utilizes the conventional switching network of the land based portion of the telephone system to establish a communication path between the mobile telephone and the telephone being called.

Frequently, it is desired to communicate with the telephone being dialed using a signalling method other than voice. For example, present telephone equipment often is able to interpret discrete tone signals as commands and data and to respond in accordance with the commands/data received. Frequently the tones to which such telephone equipment is responsive are a set of tones known as dual tone multifrequency tones, a common set of signalling tones in telephone switching which are available on many telephone instruments. In response to the receipt of such signals, the telephone equipment may perform a variety of functions such as recording the signals as representations of transactions in the telephone users' banking accounts, as commands to turn on or off equipment stationed proximate to the receiving telephone equipment, or to initiate a further telephone call through a private telephone system or through a commercial long distance carrier.

For those applications when the called telephone equipment is utilized to place a further call using private or commercial long distance carriers, often the receiving telephone equipment indicates that it is ready to accept commands by placing a supervisory tone on the communication line. It is common in such private or commercial long distance services that the service initially places a supervisory tone on the channel and awaits the keying by the telephone user of his identifying or account billing code, which is typically a multi-digit code assigned to each authorized user of the service. If the code is valid, the private or commercial service often then provides a second supervisory tone to indicate to the user that the telephone number of the second or ultimate telephone is to be dialed. Both the billing or identification codes and the telephone numbers to be dialed are often transmitted on the telephone channel using the DTMF format. Consequently, mobile telephone users who desire to utilize such private or commercial services, must have a telephone instrument which is capable of signalling in both the IMTS and DTMF formats.

In the embodiment of the present invention illustrated in FIG. 1, a keyboard 10 contains conventional pushbutton keys indicative of the digits 0 to 9 found on conventional telephone dialing apparatus and a plurality of keys indicative of functions or commands by which the user may command certain operations of the telephone instrument. A display 12 is electrically connected to the keyboard 10 and to a control circuit 14 to indicate the status of operations within the telephone instrument. The control circuit 14 additionally communicates with the keyboard 10 and with a memory unit 16.

With continued reference to FIG. 1, the control circuit 14 is also in control of an IMTS signal generator 18 and a DTMF signal generator 20. Each of the signal generators 18 and 20 communicates with a transmitter 22 which in turn communicates with an antenna 24. Signals received on the antenna 24 are communicated to a receiver 26. Signals decoded by the receiver are sent to a dial tone detector 28, the control circuit 14 and a speaker 30. A microphone 32 provides the voice signal to the transmitter 22.

In operation, whenever one of the keys of the keyboard 10 is depressed, a signal is provided to the control circuit 14 indicative of the key depressed. In this manner, the depression of a particular key enables a unique code to be generated, which code indicates the digits dialed or the function commanded. The depression of each key on the keyboard 10 may also cause illumination of the display 12 to indicate to the user that the desired key has been depressed. When the telephone user desires to place a telephone call, the user depresses one of the keys of the keyboard 10 to indicate to the telephone instrument that a call is to be placed followed by the entry on the keys of the keypad of the telephone number to be dialed. Upon receipt of the command to place the telephone call, the control circuit 14 interprets the depression of keys as the telephone number to be dialed and commands the IMTS signal generator 18 to generate the dialing signals corresponding to the depressed keys. The signals generated by the IMTS signal generator 18 are sent via the transmitter 22 and through the antenna 24 to the base station to establish the dialed telephone.

Rather than repeatedly entering on the keyboard 10 the digits of a frequently called telephone number, the memory unit 16 of the telephone instrument may be used to store telephone numbers for ready access. The stored numbers are referenced by an index number, a one or two-digit number. To store a telephone number, the appropriate function keys on the keyboard 10 are depressed to indicate to the control circuit 14 that the following sequence of numbers are a telephone dialing sequence to be stored in the memory unit 16 and to indicate the index number to be associated with the telephone number. Upon receiving the storage command, the control circuit 14 would accept the next sequence of keyboard entries as a telephone number to be stored and communicates these numbers to memory unit 16 for storage rather than sending them to IMTS signal generator 18 for transmission.

To dial a telephone dialing sequence which has previously been stored in the memory unit 16, the user first indicates via the keyboard 10 that he desires to place a call using a telephone dialing sequence stored in a memory unit 16 and identifies the desired index number. Upon receipt of the command, the control circuit 14 retrieves the telephone dialing sequence from the memory unit 16 and commands the IMTS signal generator 18 to generate the appropriate dialing signals corresponding with the retrieved telephone number.

With continued reference to FIG. 1, the telephone instrument employing the apparatus of this invention enables the user to concatenate multiple dialing sequences from the memory unit 16 and to the dialing of the individual sequences by a wait for the receipt of a supervisory tone before continuing with the dialing sequence. To accomplish this, a user indicates that he desires to place a call using a telephone dialing sequence stored in the memory unit 16 and indicates the indices of the dialing sequences which he desires to dial. If the user desires the telephone instrument to wait for the receipt of a supervisory signal before continuing the dial at any point, the user simply depresses a key on the keyboard 10 indicating an automatic wait when indicating the indices to be dialed. At the user's selection, the wait can be inserted between any or all of the retrieved dialing sequences.

On receipt of these signals from the keyboard indicating that the user desires to place a call using multiple dialing sequences, the control circuit 14 retrieves the dialing sequence indicated by the indices from the memory unit 16 and commands the IMTS signal indicator 18 to generate the IMTS signals corresponding to the dialing sequence in the order specified by the user. If the user has specified a wait either within or between dialing sequences, the control circuit 14 interrupts the dialing sequence and monitors the dial tone detector 28. The dial tone detector 28, as described more fully below, scans the appropriate frequencies to determine whether a supervisory tone signal has been received by the receiver 26 and indicates the presence of such tone to the control circuit 14. Upon receipt of an indication that dial or supervisory tone is present, the control circuit 14 resumes the dialing sequence.

Through the use of the dial tone detector 28 and the concatenation of dialing memory unit 16, the user of the telephone instrument of the present invention is able to rapidly command a complicated dialing sequence containing numerous dialing digits and waits of unknown duration for supervisory tone.

With continued reference to FIG. 1, and as heretofore noted, it is often necessary to change signalling formats at some time during the dialing sequence. The change in signalling formats may be accomplished either manually or automatically by a user of the telephone instrument of the present invention. To manually change signalling formats, a user may indicate via one of the keys on the keyboard 10 that the following dialing digits are to be dialed using a particular one of the signal generators 18, 20, entering a telephone sequence and/or requesting dialing a telephone dialing sequence stored in the memory unit 16. Alternatively, the telephone instrument of the present invention can be configured to automatically change signalling formats upon the completion of the initial dialing sequence, i.e., upon completion of the call to the first called telephone.

To automatically change signal formats, the control circuit 14 determines the length of the initial dialing sequence by examining the first and third dialed digits. If the first digit is a 1 or a 0, the length of the initial dialing sequence is seven digits long. If the first digit is a 1 or 0, the control circuit 14 next examines the third digit dialed, and if the third digit is a 1 or 0 indicating an area code, then the length of the initial dialing sequence is eleven digits, rather than eight digits. Upon the completion of the initial dialing sequence as determined by the control circuit 14, the control circuit 14 will send all further dialing commands to the DTMF signal generator 20 rather than IMTS signal generator 18.

Some known telephone instruments contain a dial tone detector circuit which is responsive to tones of a particular frequency commonly used for supervisory tones. However, various telephone manufacturers and service providers utilize equipment which generates a supervisory tone of somewhat differing frequencies. To accommodate the different frequencies of supervisory tones, it is known to tune the dial tone detection circuit to the particular frequencies being utilized by the equipment with which a particular telephone instrument is most frequently in communication. However, the detection circuit, as tuned, is unable to accurately detect supervisory tones received from other equipment not producing supervisory tones at the identical frequencies.

Figure 2:
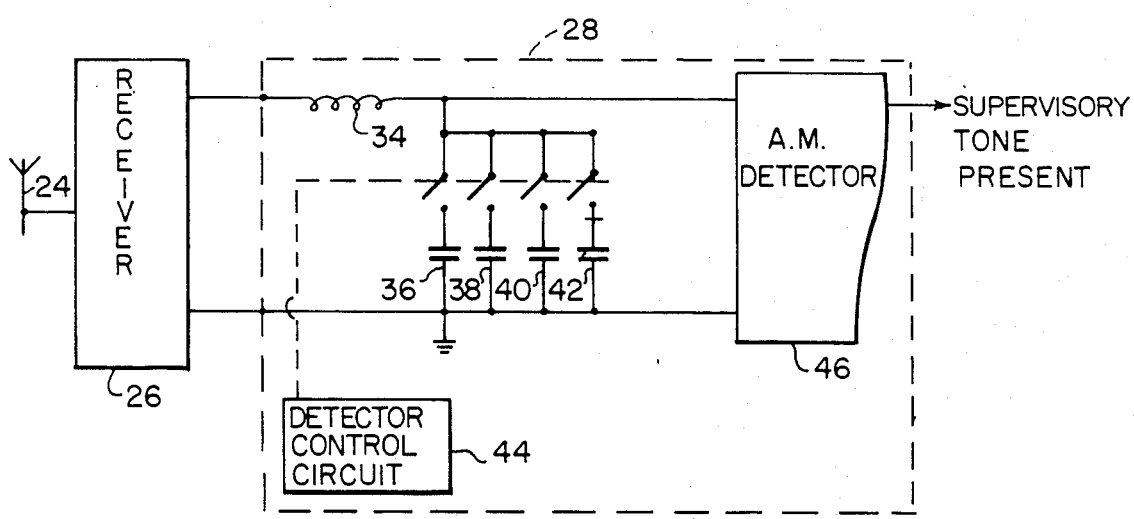
FIG. 2 is a simplified circuit diagram of a dial tone and detector of FIG. 1.

With reference to the simplified circuit diagram of a dial tone detector of FIG. 2, the signals received by the antenna 24 are provided to the receiver 26 and in turn to the dial tone detector 28. The dial tone detector 28 comprises an inductor 34 and a plurality of switched capacitors 36, 38, 40, 42. The switching of the switched capacitors 36, 38, 40, 42 is controlled by a detector control circuit 44. The received signal is subsequently sensed by an amplitude modulation detector 46 which provides a "supervisory tone present" signal upon the detection of an amplitude modulated signal of adequate duration.

In operation, the inductor 34 and the switched capacitors 36, 38, 40, 42 serve as a notch filter to center frequency depending upon which capacitors are switched into the circuit under the control of the detector control circuit 44. The detector control circuit 44 is programmed to switch the various switched capacitors 36, 38, 40, 42 in and out of the circuit in order to sweep the center frequency of the notched filter across the entire band width of interest. If a supervisory tone signal is present and received by the receiver, it will be passed through the notch filter and detected by the AM detector 46 which will then indicate the presence of the supervisory tone to the control circuit 14. The use of the sweeping notch filter for detection of the dial tone eliminates the need to reprogram the dial tone detector to frequencies used by various telephone equipment manufacturers for the supervisory tone.

FIG. 3 shows the storage assignment of individual digits within a memory unit in a prior art telephone instrument. As shown in FIG. 3, memory storage in such prior art telephone instruments is often provided into a predetermined number of registers, each register capable of storing a predetermined number of telephone dialing digits. The number of dialing digits reserved in each register in prior art systems is often sixteen or twenty and is illustrated in FIG. 3 to be fourteen.

Access to a particular dialing sequence associated with an index in prior art devices such as illustrated in FIG. 3 is often achieved computing an address related to the index number and the number of storage locations reserved for each register. In other words, for the memory storage unit of FIG. 3, register one begins in the first address, register two begins in the fifteenth address, register three begins in the twenty-ninth address and register four in the forty-third address, etc. Access to the desired register is computed by the control unit through a fairly simple algorithm. Commonly, the digits of the telephone dialing sequence are stored in the storage units of the memory unit one digit per storage unit. Often an end signal is placed at the end of each dialing sequence to indicate to the control unit that no additional digits exist in the particular dialing sequence. In FIG. 3, the end signal is indicated by an "E".

Another prior art memory unit is illustrated in FIG. 4 wherein two telephone numbers are stored in a particular register. The two telephone dialing sequences within a register are separated by another special code, often a pause command, illustrated as a "F" in FIG. 4. This type of system is disclosed in the Nicoud, et al. U.S. Pat. No. 4,039,761 issued Aug. 2, 1977, and the Derveaux, U.S. Pat. No. 4,053,718 issued Aug. 11, 1977. In such systems, the user is often required to retrieve the entire register and manually step through the unwanted telephone dialing sequences.

With reference to FIG. 5, a memory unit utilizing a storage method of the present invention is treated as a sequential string of individual storage units rather than assigned a predetermined number of memory storage locations for a particular register. Each telephone dialing sequence in the memory is preceded by a stop code, indicated in FIG. 5 as "S" and followed by an end code, shown as "E" in FIG. 5. In order to distinguish one telephone dialing sequence from the other within the memory unit, the index number associated with the telephone dialing sequence is also placed in memory immediately prior to the start code.

If the user should command that one of the telephone dialing sequences be erased from the memory unit, the telephone dialing sequence is eliminated from the storage units and the subsequent dialing sequences are moved up in the storage unit sequence to eliminate any unused space. New telephone numbers are stored at the end of the currently used space which may be indicated by a double end signal, shown as "EE" in FIG. 5.

Another embodiment of the storage method of the present invention is shown in FIG. 6 wherein a flag, denoted as "F" in the Figure is placed at the beginning of each telephone dialing sequence, followed by the index associated with the dialing sequence and the dialing sequence. The flag serves as both the start code for the telephone dialing sequence and as a stop code for the previous dialing sequence. As in the storage method of FIG. 5, all subsequent telephone dialing sequences are moved up within the sequential storage units upon the command to eliminate one of the telephone dialing sequences. An end identifier is also used to indicate the end of the storage currently being used, which is also the location at which the storage of new entries is to begin.

With reference to the embodiment of FIG. 7, the storage locations of the memory unit are treated as sequential locations and not divided into individual registers. Each telephone dialing sequence is preceded simply by a flag, designated as "F" in the FIG. 7. Each telephone dialing sequence is placed within the sequential storage locations in the order of its index number, that is, the dialing sequence associated with index 1 follows the first "F", the number associated with index 2 follows the second "F", etc. If a particular index is not utilized, the integrity of the indexing scheme is maintained by erasing the telephone dialing sequence from the memory but retaining the flag appearing before the telephone dialing sequence as shown in FIG. 8, wherein the telephone dialing sequence associated with index 3 has been erased.

Another embodiment of a storage method in accordance with the present invention is illustrated in FIG. 9 wherein a portion of the memory unit is reserved for an index and the remainder of the memory unit is treated as a sequential series of memory storage locations. Telephone dialing sequences are stored within the sequential area of the memory unit and the relative address of the beginning of the telephone dialing sequence is stored in the index space in a storage location corresponding with the index number.

For example, the telephone number associated with index number 2 is 5551212 and as shown in FIG. 9 the telephone dialing sequence is stored immediately after the preceding sequence and the second position in the index table contains an 11 to specify that telephone dialing sequence associated with index number 2 begins at the eleventh storage location within the sequential portion of the memory unit. The end of the telephone dialing sequence can be determined by scanning the index pointers to determine the start of the next telephone dialing sequence or, if in the last telephone dialing sequence, can be determined by the detection of the end code within the sequential storage area.

These and many other advantages of the present invention will be readily apparent to one skilled in the art from the claims. It should be understood that the foregoing description of the preferred embodiment is illustrative only, and that many modifications may be made without departing from the spirit thereof as defined in the claims when accorded a full range of equivalents.

What is claimed is:

1. A method of recording a plurality of telephone dialing signals, comprising the steps of:
   (a) providing a first memory means having a plurality of sequential memory units;
   (b) providing a second memory means;
   (c) receiving a first signal representing an address of a plurality of telephone dialing signals;
   (d) receiving a second signal representing the plurality of telephone dialing signals;
   (e) recording the second signal in the first unused memory unit of the first memory means;
   (f) determining the address of the second signal as recorded within the first memory means; and
   (g) recording in said second memory means the first signal and the address of the recorded second signal within the first memory means.

2. A method of dialing mobile radio telephones, comprising the steps of:
   (a) storing a plurality of groups of signals, each group of signals representing at least a portion of a telephone dialing sequence and an associated index;
   (b) selectively retrieving at least one of said groups of signals;
   (c) transmitting a plurality of dialing signals corresponding to the retrieved groups of signals on a communications channel in a first communication format;
   (d) awaiting the receipt of a tone within a predetermined frequency range on the communication channel;
   (e) selectively retrieving at least one of said groups of stored signals in response to the detection of a tone signal;
   (f) transmitting a plurality of dialing signals corresponding to the groups of signals retrieved in response to the detection of a tone signal on the communication channel in a second communications format.

3. A method of dialing mobile radio telephones, comprising the steps of:
   (a) automatically transmitting on a communications channel a plurality of initial connection signals in a first communication format;
   (b) automatically detecting the presence of a supervisory tone on the communication channel; and
   (c) automatically transmitting a plurality of dialing signals in a second communication format upon the detection of the supervisory tone on the communications channel.

4. The method of claim 3 including the step of delaying the automatic detecting step until a selective number of the initial connection signals have been transmitted.

5. The method of claim 3 wherein the automatic detecting step comprises the steps of:
   providing an audio filter circuit having input and output terminals and a plurality of switched elements;
   electrically connecting the communication channel to the input terminals of the audio filter circuit;
   selectively switching one or more of the switched elements into the filter circuit between the input and outout terminals to sequentially vary the center frequency thereof; and
   detecting the presence of an audio signal at the output terminals of the audio filter circuit.

6. The method of claim 5 further comprising the further steps of:
   (d) automatically detecting the presence of a second dial tone on the communication channel; and
   (e) transmitting a plurality of second dialing signals in the second communication format upon said detection of the second dial tone.

7. The method of claim 3 further comprising the further steps of:
   (d) automatically detecting the presence of a second dial tone on the communication channel; and
   (e) transmitting a plurality of second dialing signals in the second communication format upon said detection of the second dial tone.

8. An apparatus for automatically dialing mobile radio telephones comprising:
   memory means for storing a plurality of telephone dialing sequences;
   a command keyboard having a plurality of keys for entering selective telephone dialing sequences to be stored in said memory means and for commanding the automatic dialing; and
   control means responsive to said command keyboard for dialing sequences in dual tone multi frequency format and selectively in another preselected communications format.

9. In a method of recording signals representing a plurality of telephone dialing sequences comprising the steps of detecting a first signal representing an identification, detecting a second signal representing a telephone dialing sequence, recording in a memory device memory signals representing said second signal at a location in said memory device determined by the first signal, the improvement wherein said second signal is located adjacent said first signal, and wherein the location at which said first and second signals is recorded is immediately adjacent previously recorded memory signals.

10. An electronic apparatus for recording and dialing telephone dialing sequences comprising:

(a) command input means for selectively generating input signals, at least one of said input signals representing digits of a telephone dialing sequence and others of said input signals representing reference digits;

(b) memory means comprising a plurality of sequential memory locations;

(c) memory control means responsive to said command input means for retrieving said input signals representing digits of a telephone dialing sequence from said memory means and storing additional ones of said input signals representing both reference digits and digits of a telephone dialing sequence into said memory means in the next sequential memory location unused for the storage of others of said input signals; and (d) dialing means responsive to said memory control means for generating telephone dialing signals corresponding to a selected telephone dialing sequence.

11. A method of recording signals representing a plurality of telephone dialing sequences comprising the steps of:

(a) providing a memory having a plurality of sequential memory locations for storing signals;

(b) detecting a first signal representing an index;

(c) detecting a second signal representing a telephone dialing sequence;

(d) recording said first and second signals in the memory beginning at the first vacant memory location.

12. A method of dialing a plurality of telephone dialing sequences, comprising the steps of:

(a) providing a memory means comprising a plurality of sequential memory locations;

(b) providing first input signals representing a reference;

(c) providing second input signals representing a telephone dialing sequence;

(d) storing the first and second input signals in the first unused memory locations;

(e) detecting a third input signal representing a reference of a telephone dialing sequence to be dialed;

(f) locating the memory location containing the stored first input signal corresponding to the third input signal; and (g) generating telephone dialing signals corresponding to the second input signal stored immediately following said located memory location.

13. A mobile telephone comprising:

a transceiver operable to receive and transmit signals;

keyboard means including a plurality of individually operable keys for entering numeric and function control commands, representing a standard multifrequency tone array and a predetermined number of control functions;

first signalling means responsive to said keyboard means to generate dialing signals in a first predetermined communications format;

second signalling means responsive to said keyboard means to generate dialing signals in a second predetermined communications format;

tone detecting means responsive to the receiver portion of said transceiver to detect the presence of supervisory tones;

control means responsive to said keyboard means to selectively operatively connect said first signalling means to said transceiver thereby to transmit dialing signals in a first predetermined communications format, said control means also being responsive to said tone detection means to operatively connect said second signalling means to said transceiver for the transmission of subsequent dialing signals in said second predetermined communications format.

14. The mobile telephone of claim 13 including:

memory means for storing signals representative of at least one previously entered digit of numeric information as entered from said keyboard means; and second control means responsive to said keyboard means for retrieving signals stored in said memory means, said first and second signalling means being also responsive to said second control means.

* * * * *